(12) United States Patent
Omi

(10) Patent No.: US 7,893,673 B2
(45) Date of Patent: Feb. 22, 2011

(54) STEP-UP SWITCHING POWER SUPPLY DEVICE, AND ELECTRONIC DEVICE PROVIDED THEREWITH

(75) Inventor: Masaki Omi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 550 days.

(21) Appl. No.: 12/038,160

(22) Filed: Feb. 27, 2008

(65) Prior Publication Data

US 2008/0203984 A1   Aug. 28, 2008

(30) Foreign Application Priority Data

Feb. 28, 2007   (JP)   ............... 2007-049307

(51) Int. Cl.
*G05F 1/40* (2006.01)
(52) U.S. Cl. ..................................... 323/282
(58) Field of Classification Search ............... 323/265, 323/272, 282, 283, 351
See application file for complete search history.

(56) References Cited

U.S. PATENT DOCUMENTS

| 3,979,660 | A | * | 9/1976 | Moore ......................... 363/49 |
| 4,684,878 | A | * | 8/1987 | Giordano .................... 323/279 |
| 6,356,064 | B1 | * | 3/2002 | Tonda ......................... 323/313 |
| 7,479,773 | B2 | * | 1/2009 | Michishita .................. 323/282 |
| 7,538,526 | B2 | * | 5/2009 | Kojima et al. ............... 323/225 |
| 2008/0315850 | A1 | * | 12/2008 | Nishida ...................... 323/284 |

FOREIGN PATENT DOCUMENTS

JP   2006-304500   11/2006

* cited by examiner

*Primary Examiner*—Adolf Berhane
(74) *Attorney, Agent, or Firm*—Fish & Richardson P.C.

(57) ABSTRACT

A step-up switching power supply device with synchronous rectification includes a first switch that is turned on at startup of the device and a second switch that is turned on when an output voltage reaches an input voltage, the first and seconds switches being connected in parallel between the back gate and the source of a synchronous rectifier transistor.

16 Claims, 5 Drawing Sheets

STEP-UP SWITCHING POWER SUPPLY DEVICE, AND ELECTRONIC DEVICE PROVIDED THEREWITH

This application is based on Japanese Patent Application No. 2007-049307 filed on Feb. 28, 2007, the contents of which are hereby incorporated by reference.

BACKGROUND OF THE INVENTION

1. Field of the Invention

The present invention relates to step-up switching power supply devices (chopper power supply devices) with synchronous rectification that produce an output voltage by stepping up an input voltage, and to electronic devices provided with such step-up switching power supply devices.

2. Description of Related Art

As a conventional technology related to the present invention, a step-up switching power supply device disclosed in JP-A-2006-304500 (hereinafter "Patent Document 1") has already been proposed by the applicant of the present invention. As shown in FIG. 4, this step-up switching power supply device includes: an input terminal Ta to which an input voltage Vin is applied via an external inductor Lex; an output terminal Tb from which an output voltage Vout to a load is outputted; an output transistor N1 connected between the input terminal Ta and a predetermined reference voltage node; a first P-channel field-effect transistor P1 connected between the input terminal Ta and the output terminal Tb; a second P-channel field-effect transistor P2 connected between the output terminal Tb and the back gate of the first P-channel field-effect transistor P1; and a switching control portion CTRL performing switching control on the output transistor N1 and the first and second P-channel field-effect transistors P1 and P2. When the input voltage Vin is stepped up to obtain the output voltage Vout, the switching control portion CTRL performs switching control on the output transistor N1 and the first P-channel field-effect transistor P1 complementarily while maintaining the second P-channel field-effect transistor P2 always in an on state; when the driving of the device is stopped, the switching control portion CTRL controls the output transistor N1 and the first and second P-channel field-effect transistors P1 and P2 so as to be brought into an off state.

As described in detail in Patent Document 1, with the conventional step-up switching power supply device described above, the current path along which a current flows via a body diode BD1 attached to the transistor P1 can be cut off with the transistor P2 when stopping the driving of the device.

That is, with a configuration in which the back gate and the source of the transistor P1 are simply connected to each other to give the transistor P1 better switching characteristics, a current undesirably flows through a current path from the inductor Lex to the load via the body diode BD1 while the driving of the switching power supply device is stopped. By contrast, with a configuration in which the transistor P2 is provided on the current path from the inductor Lex to the load, and both the transistors P1 and P2 are brought into an off state when the driving of the switching power supply device is stopped, it is possible to prevent a leakage current from flowing from the inductor Lex to the load by cutting off the current path. Thus, with the conventional step-up switching power supply device described above, it is possible to appropriately cut off the current path from the node to which the input voltage Vin is applied to the load according to circumstances.

Incidentally, as increasingly high efficiencies and high output voltages have been sought in step-up switching power supply devices, increased current capacities of the transistors P1 and P2 provided on the current path from the inductor Lex to the load have been sought after. However, if the transistors P1 and P2 are simply increased in size, problems may arise, such as an abrupt increase in coil current Icoil at startup of the device, as shown in FIG. 5, leading to an unstable rising behavior of the output voltage Vout.

FIG. 5 shows, from top to bottom, the voltage waveforms of a power-off signal Soff, a gate signal Sx, a gate signal Sy, a gate signal Sz, a switching voltage Vsw, and an output voltage Vout, and the current waveform of a coil current Icoil.

One factor responsible for an increase in coil current Icoil at startup of the device (immediately after the power-off signal Soff transitions to a low level), as shown in FIG. 5, is the presence of a leakage current flowing through the transistors P1 and P2.

In order to ensure that the transistor P1 is turned off during the off period of the transistor P1 (a high level period of the gate signal Sy), it is necessary to apply a gate signal Sy having a higher voltage level than that of the input voltage Vin. However, since the gate signal Sy is produced from the output voltage Vout, even during a period when the transistor P1 should be in an off state, it cannot be turned all the way off until the time when the output voltage Vout reaches the input voltage Vin. As a result, a leakage current flows to the output terminal Tb side via the transistor P1, leading to an undesirable increase in coil current Icoil. On the other hand, during the on period of the transistor P1 (a low level period of the gate signal Sy), a current flows to the output terminal Tb side via the transistor P1 until the time when the output voltage Vout reaches the input voltage Vin, resulting in an undesirable increase in coil current Icoil.

In addition, since the transistor P2 connected between the back gate and the source of the transistor P1 is maintained always in an on state from startup of the device, a leakage current continues to flow to the output terminal Tb side via the body diode BD1 and the transistor P2 until the time when the output voltage Vout reaches the input voltage Vin, leading to an undesirable increase in coil current Icoil.

In particular, during the on period of the transistor N1, due to a passage not only of an unintended leakage current through the aforementioned transistors P1 and P2 but also of a current through the transistor N1, the coil current Icoil increases in the form of a peak, leading to an unstable rising behavior of the output voltage Vout.

Certainly, some conventional step-up switching power supply devices have an overcurrent protection capability. However, this overcurrent protection capability is designed only to monitor a current flowing through the transistor N1. As a result, as long as the monitored current is within the normal range, no matter how large an inrush current flowing through the transistors P1 and P2 is, it is impossible to reduce the inrush current, and hence prevent the above-described increase in coil current Icoil.

Furthermore, as shown in FIG. 5, the coil current Icoil shows a transitional increase when a step-up operation of the output voltage Vout is started as a result of the output voltage Vout having reached the input voltage Vin.

SUMMARY OF THE INVENTION

In view of the conventionally experienced problems described above, it is an object of the present invention to provide step-up switching power supply devices that can step up an output voltage with stability by reducing an increase in coil current occurring at startup of the device, and to provide electronic devices provided with such step-up switching power supply devices.

To achieve the above object, according to one aspect of the present invention, a step-up switching power supply device with synchronous rectification includes a first switch that is turned on at startup of the device and a second switch that is turned on when an output voltage reaches an input voltage, the first and seconds switches being connected in parallel between the back gate and the source of a synchronous rectifier transistor.

Other features, elements, steps, advantages and characteristics of the present invention will become more apparent from the following detailed description of preferred embodiments thereof with reference to the attached drawings.

DETAILED DESCRIPTION OF PREFERRED EMBODIMENTS

Hereinafter, as an example of implementation, a description will be given of a case where the present invention is applied to a DC/DC converter that is incorporated into a cellular phone terminal and that converts an output voltage of a battery into a drive voltage used to drive different parts (for example, a TFT (thin film transistor) liquid crystal panel) of the terminal.

Figure 1:
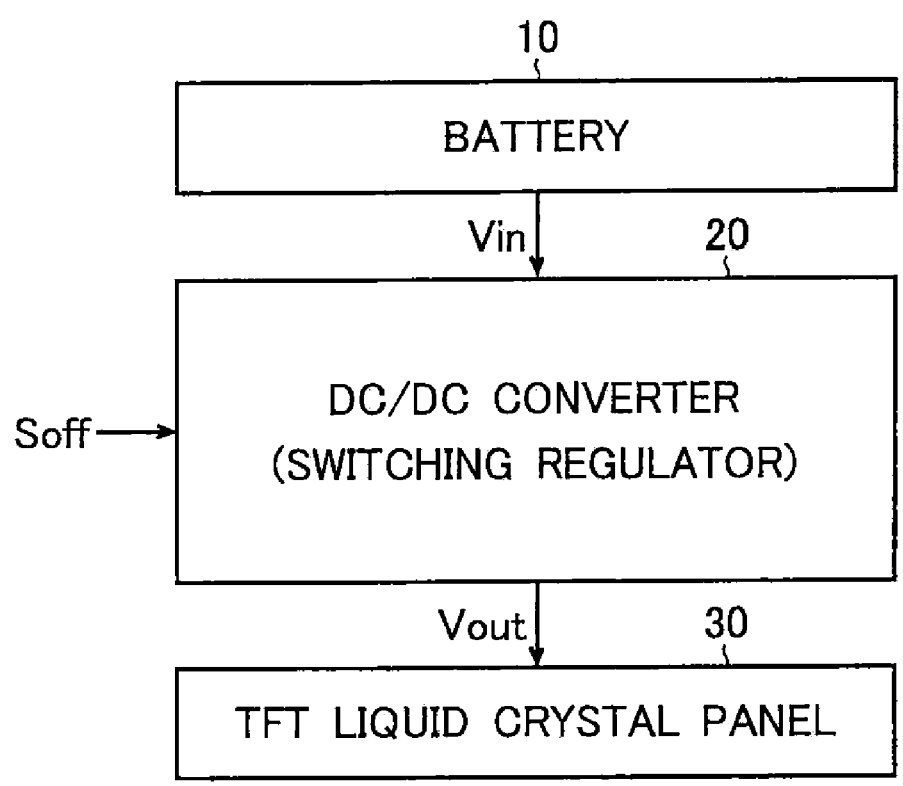
FIG. 1 is a block diagram showing an embodiment of a cellular phone terminal according to the present invention.

FIG. 1 is a block diagram showing an embodiment of the cellular phone terminal (in particular, around a power supply system for the TFT liquid crystal panel) according to the invention. As shown in the figure, the cellular phone terminal of this embodiment includes a battery 10 that supplies power to the terminal, a DC/DC converter 20 that converts an output of the battery 10, and a TFT liquid crystal panel 30 on which the cellular phone terminal displays information etc. Needless to say, the cellular phone terminal further includes, although unillustrated, other functional blocks with which it achieves its essential capabilities (communication and other capabilities), such as a transmitter/receiver circuit, a speaker, a microphone, an operation panel, and a memory.

The DC/DC converter 20 produces a given output voltage Vout from an input voltage Vin applied thereto from the battery 10, and feeds the output voltage Vout thus produced to the TFT liquid crystal panel 30.

Figure 2:
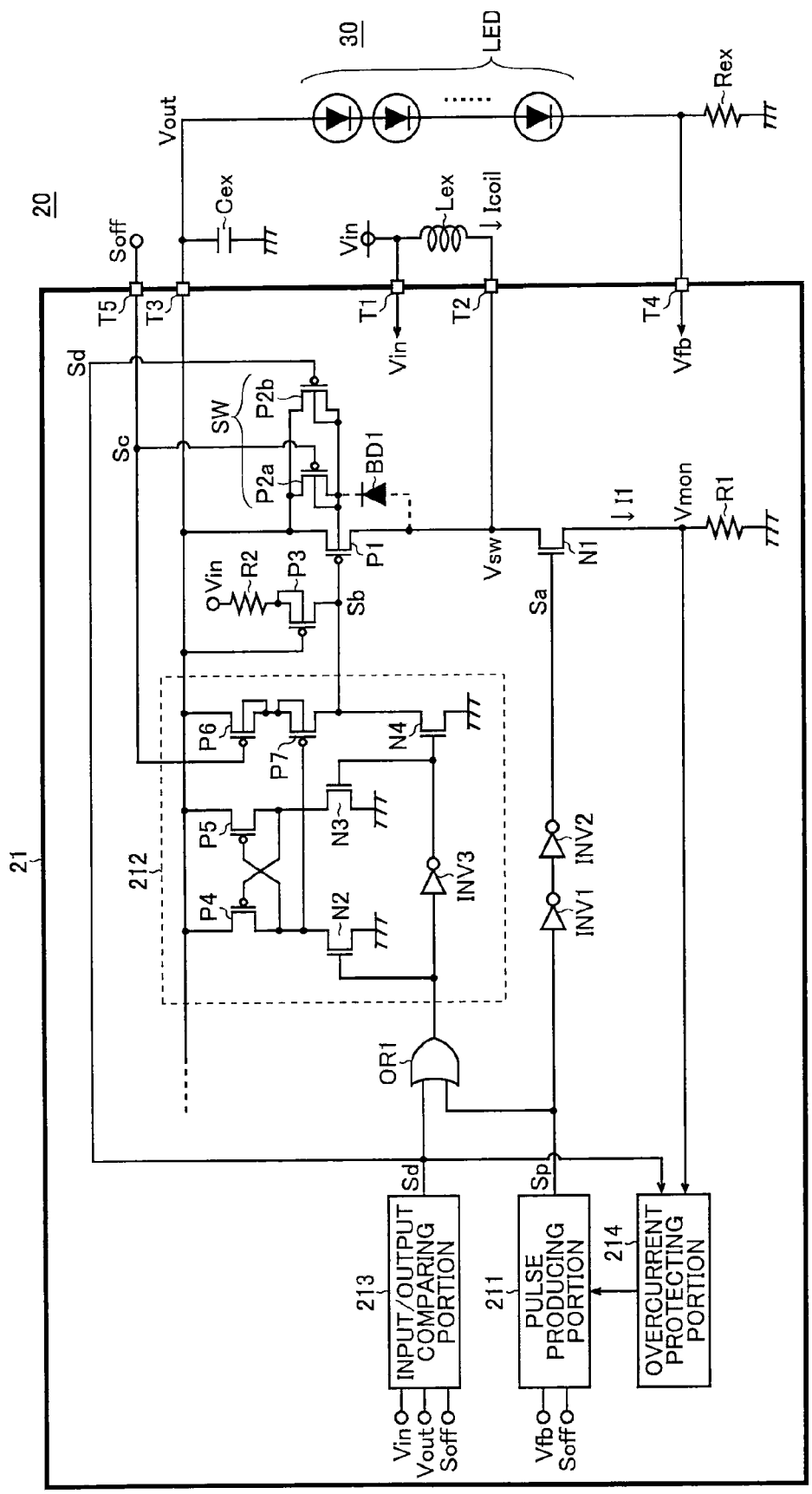
FIG. 2 is a circuit diagram showing an example of the configuration of the DC/DC converter 20.

FIG. 2 is a circuit diagram (part of which is a block diagram) showing an example of the configuration of the DC/DC converter 20. As shown in the figure, the DC/DC converter 20 of this embodiment is a step-up switching regulator (chopper regulator) including, in addition to a switching power supply IC 21, an external inductor Lex, a smoothing capacitor Cex, and a resistor Rex.

The switching power supply IC 21 is composed of, in addition to circuit blocks such as a pulse producing portion 211, a level shift portion 212, an input/output comparing portion 213, and an overcurrent protecting portion 214, N-channel field-effect transistors N1 to N4, P-channel field-effect transistors P1, P2a, P2b, P3, P4, P5, P6, and P7, resistors R1 and R2, inverters INV1, INV2, and INV3, and an OR logic unit OR1, all of which are integrated into a single chip.

The switching power supply IC 21 is electrically connected to the outside of the IC via external terminals T1, T2, T3, T4, and T5.

Incidentally, any other protection circuit block (such as a low-voltage malfunction prevention circuit or an overheating protection circuit) may be incorporated as appropriate into the switching power supply IC 21 along with the above-described circuit components.

Outside the switching power supply IC 21, the external terminal T1 (the power supply terminal) is connected to a node to which the input voltage Vin fed from the battery 10 is applied, and is connected to one end of the inductor Lex. The external terminal T2 (the input terminal) is connected to the other end of the inductor Lex. The external terminal T3 (the output terminal) is grounded via the smoothing capacitor Cex, and is connected to the anode of a light-emitting diode array LED of the TFT liquid crystal panel 30 acting as a load. The external terminal T4 (the output feedback terminal) is grounded via the resistor Rex, and is connected to the cathode of the light-emitting diode array LED. The external terminal T5 (the power-off terminal) is connected to a node to which a power-off signal Soff for controlling activation/deactivation of the device is applied.

On the other hand, inside the switching power supply IC 21, the drain of the transistor N1 is connected to the external terminal T2, and the source thereof is connected to a ground (a node to which a reference voltage is applied) via the resistor R1. The gate of the transistor N1 is connected to a node to which a pulse signal Sp is applied (an output node of the pulse producing portion 211) via the inverters INV1 and INV2. The transistor N1 has an ON resistance of several hundred mΩ (for example, 0.3Ω).

The drain of the transistor P1 is connected to the external terminal T2, and the source thereof is connected to the external terminal T3. The gate of the transistor P1 is connected to the output terminal of the OR logic unit OR1 via the level shift portion 212 (the circuit block enclosed with a dashed line in the figure). The transistor P1 has an ON resistance of a few Ω (for example, 4Ω). Between the drain and the back gate of the transistor P1, a body diode BD1 is provided in such a way that the anode thereof is connected to the drain of the transistor P1 and the cathode thereof is connected to the back gate of the transistor P1.

The drains of the transistors P2a and P2b are connected to the external terminal T3. The sources of the transistors P2a and P2b are connected to the back gate of the transistor P1. The gate of the transistor P2a is connected to the external terminal T5. The gate of the transistor P2b is connected to a node to which a comparison signal Sd is applied (an output node of the input/output comparing portion 213). The back gates of the transistors P2a and P2b are each connected to their own source.

That is, the switching power supply IC 21 of this embodiment is so configured as to have the transistors P2a and P2b connected in parallel between the back gate and the source of the transistor P1. The transistors P2a and P2b each have an ON resistance of several dozen Ω (for example, 50Ω and 33Ω, respectively).

The drain of the transistor P3 is connected to the gate of the transistor P1, and the source thereof is connected to the external terminal T1 (the terminal to which the input voltage Vin is applied) via the resistor R2. The gate of the transistor P3 is connected to the external terminal T3, and the back gate thereof is connected to the source of the transistor P3.

The sources of the transistors P4 and P5 are connected to the external terminal T3. The drain of the transistor P4 is connected to the drain of the transistor N2 and to the gate of the transistor P5. The drain of the transistor P5 is connected to the drain of the transistor N3 and to the gate of the transistor P4. The sources of the transistors N2 and N3 are connected to a ground.

The source of the transistor P6 is connected to the external terminal T3, the drain thereof is connected to the source of the transistor P5, the gate thereof is connected to the external terminal T5, and the back gate thereof is connected to the drain of the transistor P6. The drain of the transistor P7 is connected to the drain of the transistor N4 and to the gate of the transistor P1, the gate thereof is connected to the drain of the transistor N2, and the back gate thereof is connected to the source of the transistor P7. The source of the transistor N4 is connected to a ground.

One input terminal of the OR logic unit OR1 is connected to a node to which a pulse signal Sp is applied (an output node of the pulse producing portion 211), and the other input terminal thereof is connected to a node to which a comparison signal Sd is applied (an output node of the input/output comparing portion 213). The output terminal of the OR logic unit OR1 is connected to the gate of the transistor N2 and to the input terminal of the inverter INV3. The output terminal of the inverter INV3 is connected to the gates of the transistors N3 and N4.

The pulse producing portion 211 produces a pulse signal Sp for controlling the transistors N1 and P1 to turn on/off complementarily (exclusively) when obtaining the output voltage Vout by stepping up the input voltage Vin. For the pulse producing portion 211, a well-known conventional technology can be satisfactorily adopted, and therefore the internal configuration of the pulse producing portion 211 will not be described in detail nor depicted in a particular figure. For example, the pulse producing portion 211 may be composed of: an error amplifier that amplifies a difference between an output feedback voltage Vfb outputted from one end of the resistor Rex and a predetermined target voltage Vref, and thereby produces an error voltage signal Verr; an oscillator that produces a predetermined triangular wave voltage signal Vslope; and a PWM comparator that produces a PWM signal by comparing the error voltage signal Verr with the triangular wave voltage signal Vslope, and may be so configured as to control the duty cycle of the pulse signal Sp based on the PWM signal. As described above, by performing the feedback control based on the output feedback voltage Vfb, it is possible to adjust the output voltage Vout to a given target value. Incidentally, while the driving of the device is instructed to be stopped with a high-level power-off signal Soff, the pulse signal Sp is kept at a low level.

The level shift portion 212 produces a gate signal Sb of the transistor P1 from an output signal (a logical OR of the pulse signal Sp and the comparison signal Sd) of the OR logic unit OR1 by using the output voltage Vout.

The input/output comparing portion 213 makes a comparison between the input voltage Vin and the output voltage Vout to determine which one of them is higher than the other, and produces a comparison signal Sd at a logic level commensurate with a comparison result. In the switching power supply IC 21 of this embodiment, if the output voltage Vout is lower than the input voltage Vin, the comparison signal Sd takes a high level (input voltage Vin); if the output voltage Vout is higher than the input voltage Vin, the comparison signal Sd takes a low level (ground voltage GND). While the driving of the device is instructed to be stopped with a high-level power-off signal Soff, the comparison signal Sd is kept at a high level.

The overcurrent protecting portion 214 checks whether or not a current I1 flowing through the transistor N1 is in an overcurrent state (whether or not it reaches a predetermined overcurrent limit threshold Ilimit) based on a monitoring voltage Vmon outputted from one end of the resistor R1, and gives an instruction to the pulse producing portion 211 to reduce the current I1 if the current I1 is found to be in an overcurrent state. In the switching power supply IC 21 of this embodiment, the overcurrent protecting portion 214 includes the capability of performing variable control of the aforementioned overcurrent limit threshold Ilimit based on the comparison signal Sd. This capability will be described in detail later.

First, the basic operation (DC/DC conversion in a steady state) of the switching power supply IC 21 configured as described above will be described.

The transistor N1 is an output transistor whose on/off is controlled according to the gate signal Sa, and the transistor P1 is a synchronous rectifier transistor whose on/off is controlled according to the gate signal Sb.

In the switching power supply IC 21 in a steady state (from time point t2 in FIG. 3) in which a desired output voltage Vout is produced by stepping up the input voltage Vin, the transistors P2a and P2b are maintained always in an on state, and the transistors N1 and P1 are so controlled as to turn on/off complementarily (exclusively).

It should be understood that the term "complementarily (exclusively)" used in this specification covers not only cases where the turning on and off of the transistor N1 takes place exactly oppositely to that of the transistor P1 but also cases where, from the perspective of preventing a through current, the turning on and off of the transistor N1 takes place oppositely to but with a predetermined delay relative to that of the transistor P1.

When the transistor N1 is turned on, a coil current Icoil flows through the inductor Lex toward a ground via the transistor N1, and electric energy is stored in the inductor Lex. It is to be noted that, in the on period of the transistor N1, if electric charge has already been stored in the smoothing capacitor Cex, a current from the smoothing capacitor Cex flows through the load, namely the light-emitting diode array LED. At this point, since the transistor P1, which is a synchronous rectifier device, is complementarily (exclusively) turned off relative to the on state of the transistor N1, the current does not flow from the smoothing capacitor Cex to the transistor N1.

On the other hand, when the transistor N1 is turned off, a counter electromotive force is produced in the inductor Lex, whereby the electric energy stored therein is liberated. At this point, since the transistor P1 is complementarily (exclusively) turned on relative to the off state of the transistor N1, the coil current Icoil flowing from the external terminal T2 through the transistor P1 flows into the load, namely the light-emitting diode array LED, through the external terminal T3, and also flows into a ground via the smoothing capacitor Cex, thereby charging the smoothing capacitor Cex. The above-described operation is repeatedly performed, whereby a pulsed switching voltage Vsw appearing at a node at which the transistors N1 and P1 are connected together is smoothed by the smoothing capacitor Cex, and a desired output voltage Vout is supplied to the load, namely the light-emitting diode array LED.

As described above, the switching power supply IC 21 of this embodiment functions as one component element of a chopper step-up circuit that produces an output voltage Vout by stepping up an input voltage Vin by performing switching control on the transistors N1 and P1.

Figure 3:
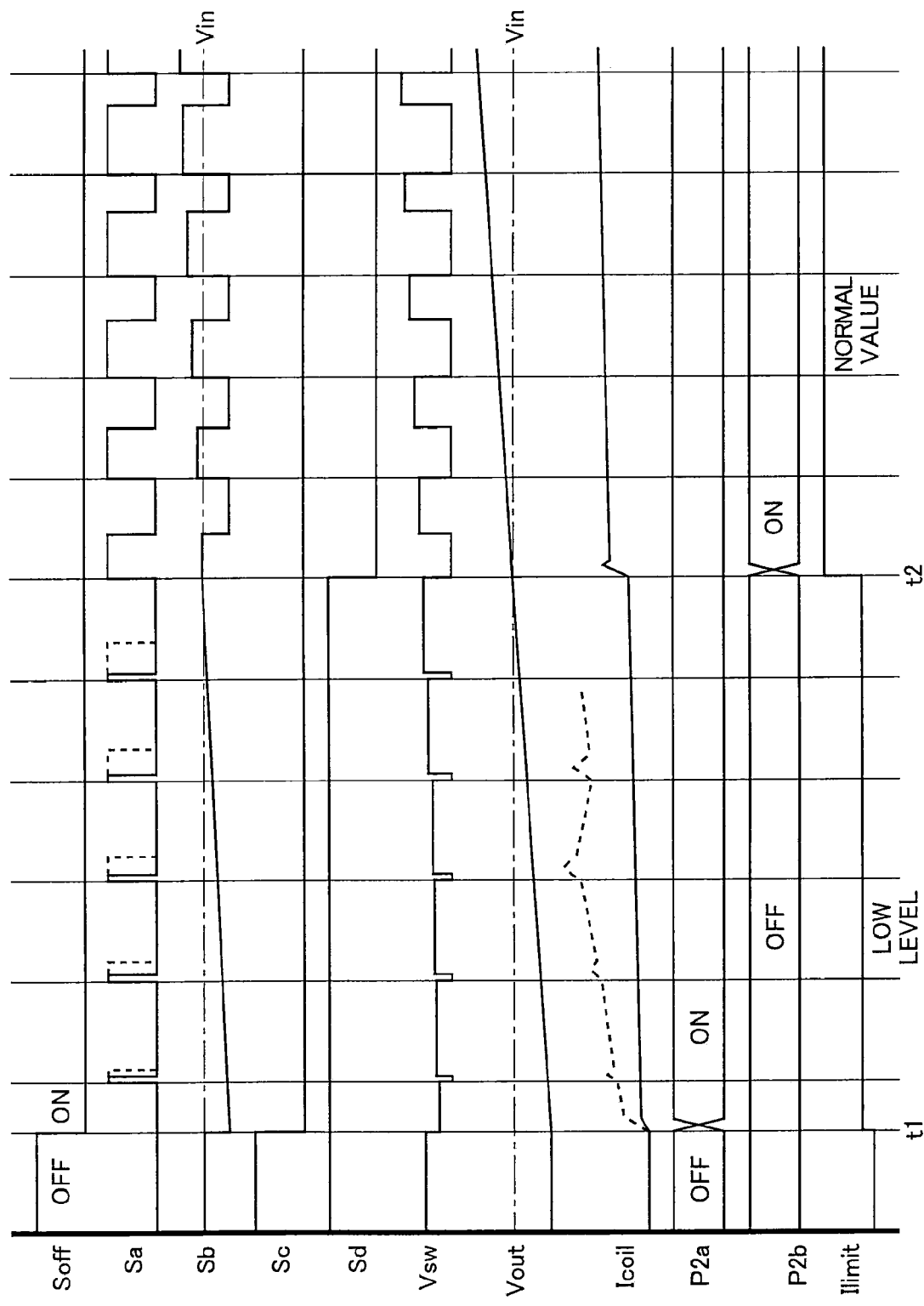
FIG. 3 is a diagram illustrating the operation performed to reduce an increase in coil current occurring at startup.
Figure 4:
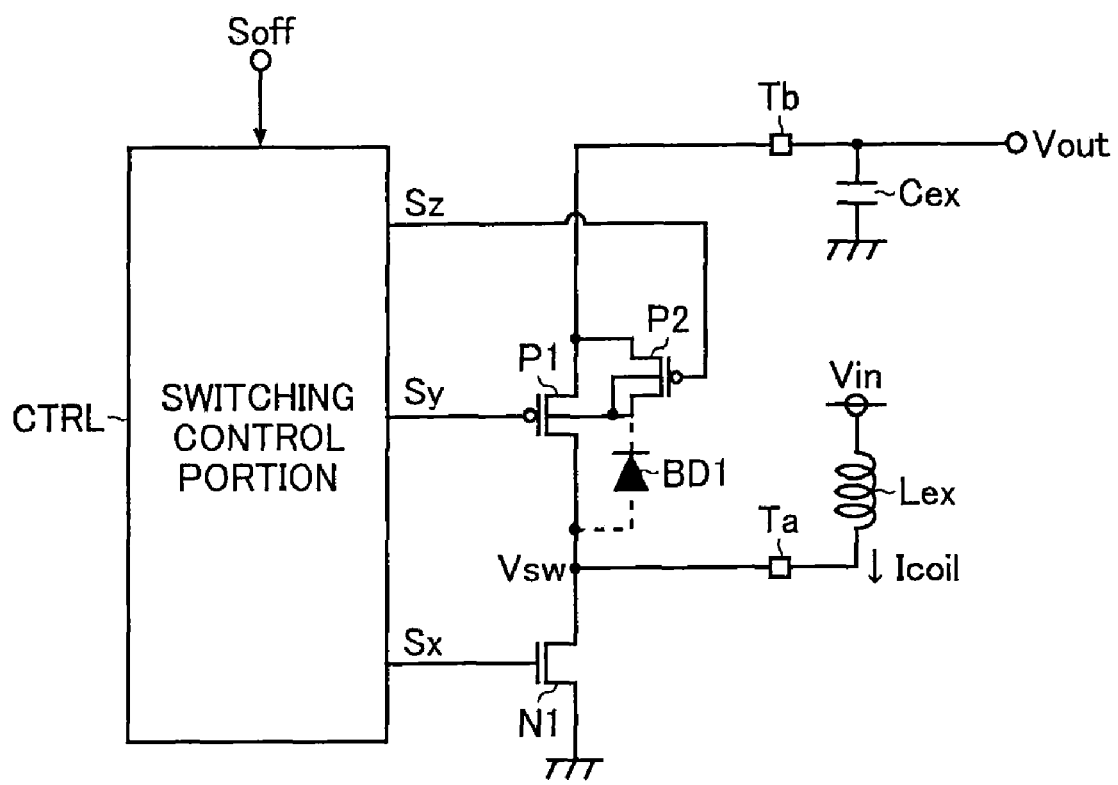
FIG. 4 is a circuit diagram showing an example of a conventional switching power supply device.
Figure 5:
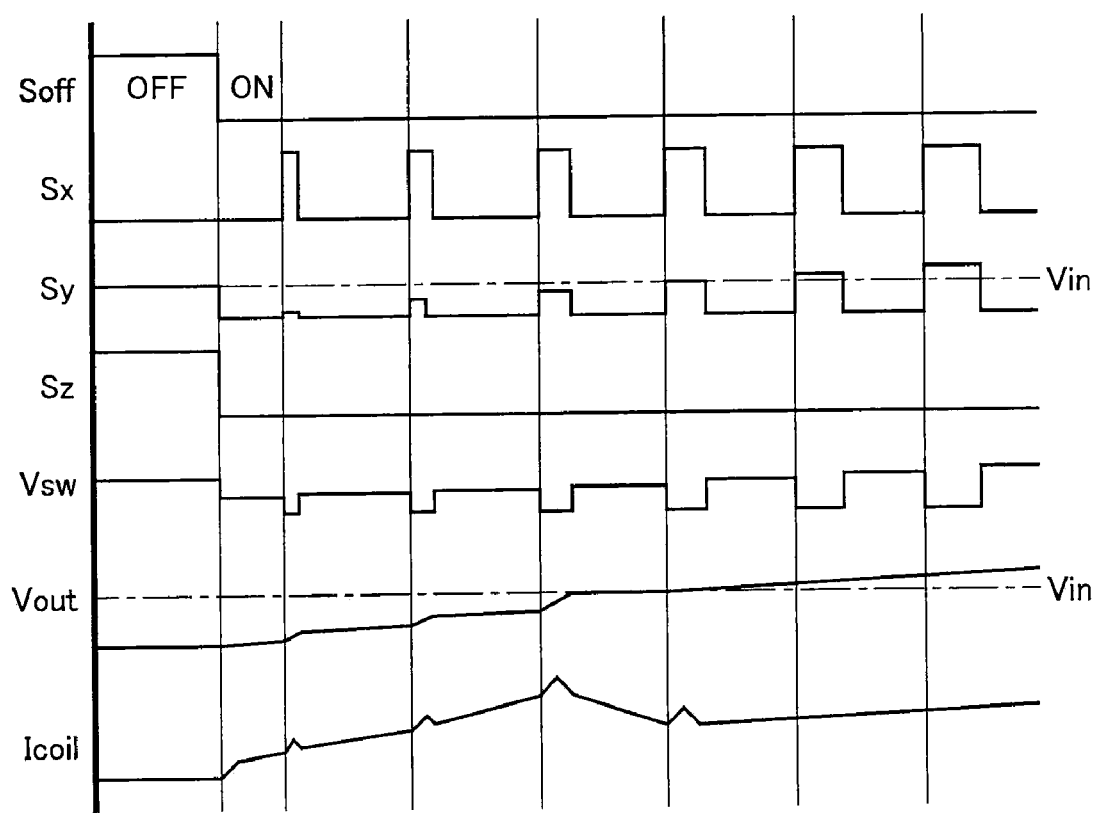
FIG. 5 is a diagram illustrating an increase in coil current occurring at startup.

Next, with reference to FIG. 3 along with FIG. 2, operation performed to reduce an increase in coil current Icoil occurring at startup of the switching power supply IC 21 configured as described will be specifically described.

FIG. 3 is a diagram illustrating the operation performed to reduce an increase in coil current occurring at startup. FIG. 3 shows, from top to bottom, the voltage waveforms of a power-off signal Soff, a gate signal Sa, a gate signal Sb, a gate signal Sc, a comparison signal Sd, a switching voltage Vsw, and an output voltage Vout, the current waveform of a coil current Icoil, the on/off states of transistors P2a and P2b, and the set value of an overcurrent limit threshold Ilimit. In FIG. 3, the behaviors of the gate signal Sa and the coil current Icoil observed in the present invention are indicated by solid lines, and those observed in the conventional example are indicated by dashed lines.

While the power-off signal Soff takes a high level (prior to time point t1), since the gate signal Sa (pulse signal Sp) of the transistor N1 is kept at a low level by the pulse producing portion 211, the transistor N1 is maintained in an off state. Since the gate signal Sb of the transistor P1 is pulled up to the input voltage Vin via the transistor P3 and the resistor R2, the transistor P1 is also maintained in an off state. The transistor P2a is also maintained in an off state, because the power-off signal Soff is applied as the gate signal Sc of the transistor P2a. Since the gate signal Sd (comparison signal Sd) of the transistor P2b is kept at a high level by the input/output comparing portion 213, the transistor P2b is also maintained in an off state. As described above, while the power-off signal Soff takes a high level, the driving of the switching power supply IC 21 is stopped.

It should be noted that the transistors P2a and P2b described above are provided for cutting off a current path via the body diode BD1 attached to the transistor P1. That is, with a configuration in which the back gate and the source of the transistor P1 are simply connected to each other to give the transistor P1 better switching characteristics, a current undesirably flows through a current path from the inductor Lex to the light-emitting diode array LED via the body diode BD1 while the driving of the switching power supply IC 21 is stopped. By contrast, with a configuration in which the transistors P2a and P2b are provided on the current path, and all of the transistors P1, P2a, and P2b are brought into an off state when the driving of the switching power supply IC 21 is stopped, it is possible to prevent a leakage current from flowing from the inductor Lex to the light-emitting diode array LED by cutting off the current path.

When the power-off signal Soff transitions to a low level at time point t1, the switching power supply IC 21 is activated. At the same time, the pulse producing portion 211 starts to produce the pulse signal Sp, so as to perform switching control on the transistors N1 and P1.

Here, the switching power supply IC 21 of this embodiment is so configured as to control the transistors P2a and P2b connected between the back gate and the source of the transistor P1 in such a way that the transistor P2a is so controlled as to turn on/off according to the power-off signal Soff, and the transistor P2b is so controlled as to turn on/off according to the comparison signal Sd.

In the switching power supply IC 21 configured as described above, from the time when the switching power supply IC 21 is activated until the time when the output voltage Vout reaches the input voltage Vin (from time point t1 to time point t2), the comparison signal Sd is kept at a high level. As a result, only the transistor P2a turns on, while the transistor P2b is maintained in an off state. Therefore, only the ON resistance of the transistor P2a is selected as the ON resistance of the current path formed between the back gate and the source of the transistor P1.

On the other hand, when the output voltage Vout reaches the input voltage Vin at time point t2, the comparison signal Sd transitions to a low level, and accordingly the transistor P2b turns on. As a result, the ON resistance of the current path formed between the back gate and the source of the transistor P1 is reduced to a combined resistance of the ON resistances of the transistors P2a and P2b connected in parallel.

For example, let the ON resistances of the transistors P2a and P2b be designed to be 50Ω and 33Ω, respectively. Then, until the time when the output voltage Vout reaches the input voltage Vin, the ON resistance of the current path formed between the back gate and the source of the transistor P1 is 50Ω; after the output voltage Vout reaches the input voltage Vin, the ON resistance thereof is 20Ω.

Thus, until the time when the output voltage Vout reaches the input voltage Vin, by increasing the ON resistance of a current path formed between the back gate and the source of the transistor P1, it is possible to reduce a leakage current flowing through the current path, and thereby avoid an increase in coil current Icoil. After the output voltage Vout reaches the input voltage Vin, that is, after the completion of activation, by reducing the ON resistance of the current path, it is possible to achieve high efficiency and high output voltage.

Incidentally, the transistor P1 has a very large current capacity (about five times as large as that of the transistor P2a). Thus, if a higher priority is given to stepping up the output voltage Vout smoothly by reducing an increase in coil current Icoil, it is preferred not to turn on the transistor P1 in a positive manner until the time when the output voltage Vout reaches the input voltage Vin.

It is for this reason that the switching power supply IC 21 of this embodiment is so configured as to include the OR logic unit OR1 that takes the OR of the pulse signal Sp and the comparison signal Sd, and outputs the operation result thus obtained to the level shift portion 212.

In the switching power supply IC 21 configured as described above, from the time when the switching power supply IC 21 is activated until the time when the output voltage Vout reaches the input voltage Vin (from time point t1 to time point t2), since the comparison signal Sd is kept at a high level, the pulse signal Sp produced by the pulse producing portion 211 is masked by the OR logic unit OR1. As a result, the gate signal Sb of the transistor P1 is always kept at a high level (in this case, at the output voltage Vout) independently of the pulse signal Sp. That is, the on period (the low level period) of the transistor P1 is masked by the OR logic unit OR1.

With this configuration, it is possible to step up the output voltage Vout smoothly while reducing an increase in coil current Icoil without turning on the transistor P1 in a positive manner until the time when the output voltage Vout reaches the input voltage Vin. In particular, when the output voltage Vout rises close to the input voltage Vin, the transistor P1 can be turned all the way off with the gate signal Sb. As a result, mask control of the pulse signal Sp by the OR logic unit OR1 greatly contributes to a reduced increase in coil current Icoil.

In addition, in the switching power supply IC 21 of this embodiment, the overcurrent protecting portion 214 is so configured as to set, based on the comparison signal Sd, the overcurrent limit threshold Ilimit at a level (a level that is set for deliberately detecting that the current I1 flowing through the transistor N1 is in an overcurrent state, even when it is actually within the normal range, and thereby starting to reduce the current I1) lower than the level in a steady state until the time when the output voltage Vout reaches the input voltage Vin.

With this configuration, until the time when the output voltage Vout reaches the input voltage Vin, the on period of the transistor N1 (the high level period of the gate signal Sa) is set to be shorter than that set by the soft start function (the function of gradually increasing the duty ratio of the on periods of the transistor N1 at startup of the device) of the pulse producing portion 211. This makes it possible to reduce the flow of the current I1 flowing through the transistor N1, and hence lower the peak of the coil current Icoil appearing in the on period of the transistor N1.

Note that, although the configurations described above (variable control of ON resistance with the transistors P2a and P2b, mask control of pulse signal Sp with the OR logic unit OR1, and variable control of overcurrent limit threshold Ilimit based on the comparison signal Sd) can individually reduce an increase in coil current Icoil, it is preferable that all the configurations are used in combination so as to step up the output voltage Vout with stability by reducing the inrush current at startup of the device.

The embodiment described above deals with a case in which the invention is applied to a DC/DC converter 20 that is incorporated into a cellular phone terminal for converting an output of a battery 10. This, however, is not meant to limit the application of the invention in any way; the invention finds wide application in step-up switching power supply devices in general.

Obviously, many modifications and variations of the present invention are possible in light of the above teachings. It is therefore to be understood that within the scope of the appended claims, the invention may be practiced other than as specifically described.

The invention offers the following advantages: it helps realize step-up switching power supply devices that can step up an output voltage with stability by reducing an increase in coil current occurring at startup of the device; hence it helps realize electronic devices incorporating such step-up switching power supply devices and thus offering a higher degree of reliability.

In terms of industrial applicability, the invention is extremely useful in enhancing the reliability of electronic devices incorporating a step-up switching power supply device. The invention is suitable to all kinds of electronic devices incorporating a switching power supply device, examples of such devices including electronic devices using a battery (such as cellular phone terminals, notebook-size personal computers, and PDAs (personal digital/data assistants)) and in-vehicle devices (such as car navigation systems and car audio systems) that require a high degree of reliability.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the present invention which fall within the true spirit and scope of the invention.

What is claimed is:

1. A step-up switching power supply device with synchronous rectification that produces a desired output voltage by stepping up an input voltage, the step-up switching power supply device comprising:
   an output transistor;
   a synchronous rectifier transistor;
   a first switch that is turned on at startup of the device; and
   a second switch that is turned on when the output voltage reaches the input voltage,
   wherein the first and second switches are connected in parallel between a back gate and a source of the synchronous rectifier transistor.

2. The step-up switching power supply device of claim 1, wherein the input voltage is applied to one end of an inductor, and the output transistor is connected between another end of the inductor and a node to which a reference voltage is applied,
   wherein the synchronous rectifier transistor is connected between another end of the inductor and a node from which the output voltage is outputted.

3. The step-up switching power supply device of claim 2, further comprising:
   an input/output comparing portion that makes a comparison between the input voltage and the output voltage to determine which one of the input voltage and the output voltage is higher than another, and produces a comparison signal at a logic level commensurate with a comparison result.

4. The step-up switching power supply device of claim 3, wherein the first switch is a first transistor whose on/off is controlled according to a power-off signal for controlling activation/deactivation of the device,
   wherein the second switch is a second transistor whose on/off is controlled according to the comparison signal.

5. The step-up switching power supply device of claim 4, further comprising:
   a pulse producing portion that produces a pulse signal used as a gate signal of the output transistor; and
   a level shift portion that produces, from the pulse signal, a gate signal of the synchronous rectifier transistor by using the output voltage.

6. The step-up switching power supply device of claim 5, further comprising:
   an OR logic unit that takes an OR of the pulse signal and the comparison signal, and outputs an operation result to the level shift portion.

7. The step-up switching power supply device of claim 5, further comprising:
   an overcurrent protecting portion that checks whether or not a current flowing through the output transistor reaches a predetermined overcurrent limit threshold, and gives an instruction to the pulse producing portion to reduce the current if the current is found to be in an overcurrent state,
   wherein the overcurrent protecting portion sets the overcurrent limit threshold at a level lower than a level in a steady state based on the comparison signal until a time when the output voltage reaches the input voltage.

8. The step-up switching power supply device of claim 6, further comprising:
   an overcurrent protecting portion that checks whether or not a current flowing through the output transistor reaches a predetermined overcurrent limit threshold, and gives an instruction to the pulse producing portion to reduce the current if the current is found to be in an overcurrent state,
   wherein the overcurrent protecting portion sets the overcurrent limit threshold at a level lower than a level in a steady state based on the comparison signal until a time when the output voltage reaches the input voltage.

9. An electronic device, comprising:

a battery that supplies power to the electronic device; and a step-up switching power supply device with synchronous rectification that produces a desired output voltage by stepping up an input voltage fed from the battery, wherein the step-up switching power supply device comprises:

an output transistor;

a synchronous rectifier transistor;

a first switch that is turned on at startup of the device; and a second switch that is turned on when the output voltage reaches the input voltage, wherein the first and second switches are connected in parallel between a back gate and a source of the synchronous rectifier transistor.

10. The electronic device of claim 9, wherein the input voltage is applied to one end of an inductor, and the output transistor is connected between another end of the inductor and a node to which a reference voltage is applied, wherein the synchronous rectifier transistor is connected between another end of the inductor and a node from which the output voltage is outputted.

11. The electronic device of claim 10, wherein the step-up switching power supply device further comprises:

an input/output comparing portion that makes a comparison between the input voltage and the output voltage to determine which one of the input voltage and the output voltage is higher than another, and produces a comparison signal at a logic level commensurate with a comparison result.

12. The electronic device of claim 11, wherein the first switch is a first transistor whose on/off is controlled according to a power-off signal for controlling activation/deactivation of the device, wherein the second switch is a second transistor whose on/off is controlled according to the comparison signal.

13. The electronic device of claim 12, wherein the step-up switching power supply device further comprises:

a pulse producing portion that produces a pulse signal used as a gate signal of the output transistor; and a level shift portion that produces, from the pulse signal, a gate signal of the synchronous rectifier transistor by using the output voltage.

14. The electronic device of claim 13, wherein the step-up switching power supply device further comprises:

an OR logic unit that takes an OR of the pulse signal and the comparison signal, and outputs an operation result to the level shift portion.

15. The electronic device of claim 13, wherein the step-up switching power supply device further comprises:

an overcurrent protecting portion that checks whether or not a current flowing through the output transistor reaches a predetermined overcurrent limit threshold, and gives an instruction to the pulse producing portion to reduce the current if the current is found to be in an overcurrent state, wherein the overcurrent protecting portion sets the overcurrent limit threshold at a level lower than a level in a steady state based on the comparison signal until a time when the output voltage reaches the input voltage.

16. The electronic device of claim 14, wherein the step-up switching power supply device further comprises:

an overcurrent protecting portion that checks whether or not a current flowing through the output transistor reaches a predetermined overcurrent limit threshold, and gives an instruction to the pulse producing portion to reduce the current if the current is found to be in an overcurrent state, wherein the overcurrent protecting portion sets the overcurrent limit threshold at a level lower than a level in a steady state based on the comparison signal until a time when the output voltage reaches the input voltage.

* * * * *